Aug. 17, 1943.  G. O. KIMMELL  2,327,111
APPARATUS FOR REMOVING SAMPLES FROM FLOWING STREAMS
Filed July 27, 1940  4 Sheets-Sheet 1
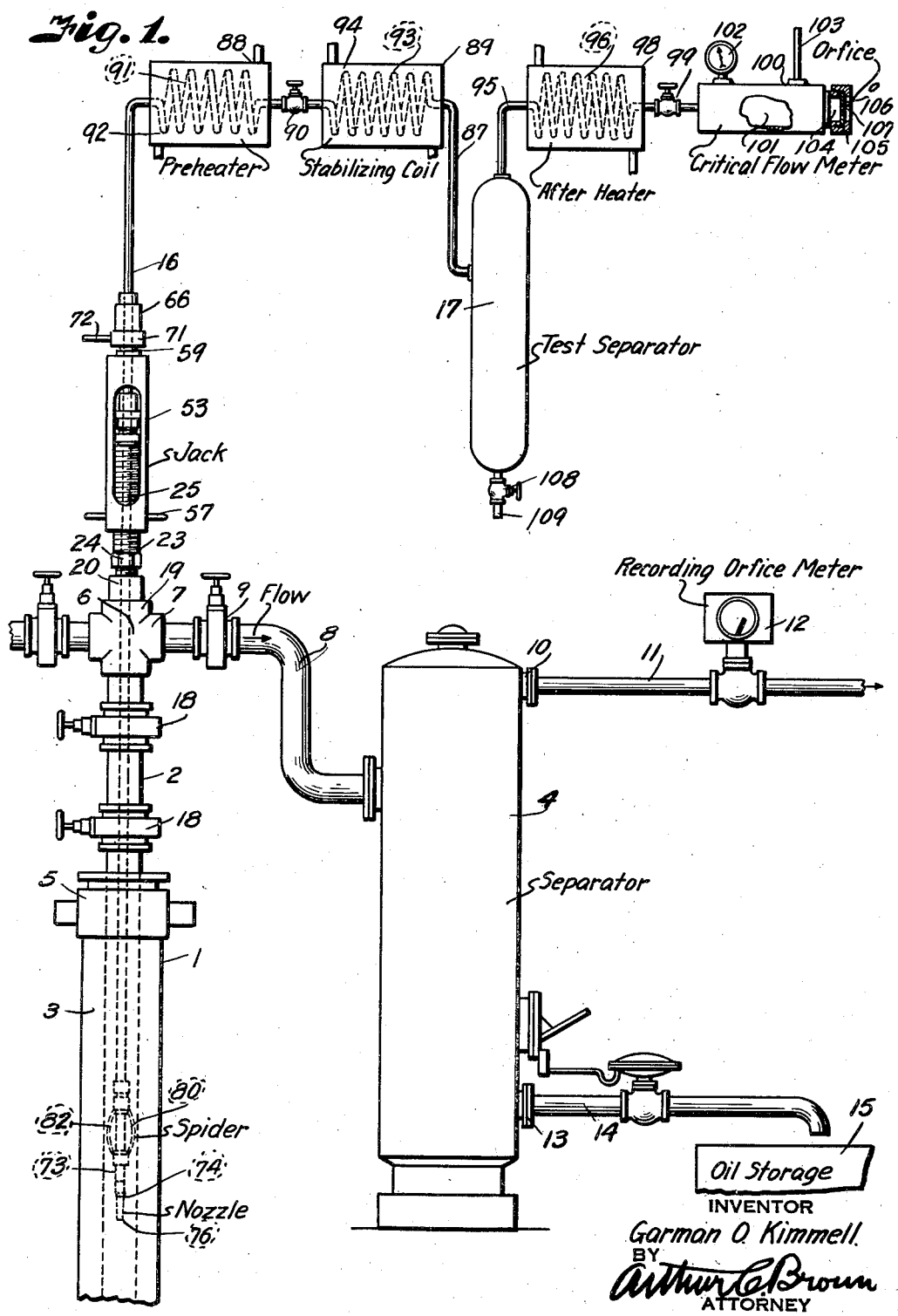
INVENTOR
Garman O. Kimmell
BY
Arthur L. Brown
ATTORNEY Aug. 17, 1943.   G. O. KIMMELL   2,327,111
APPARATUS FOR REMOVING SAMPLES FROM FLOWING STREAMS
Filed July 27, 1940   4 Sheets-Sheet 2
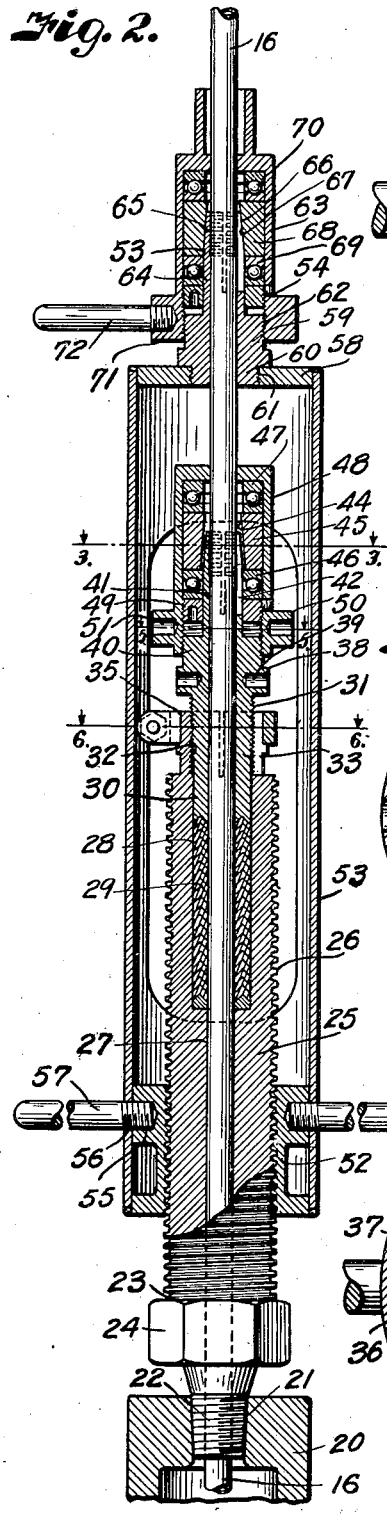
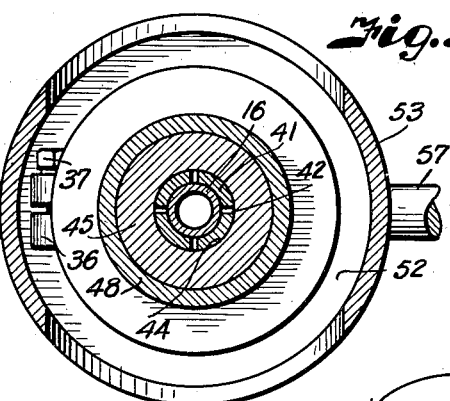
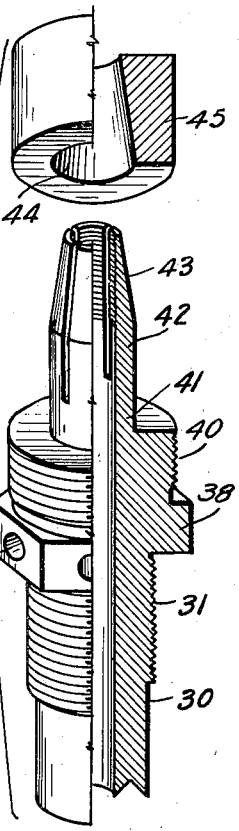
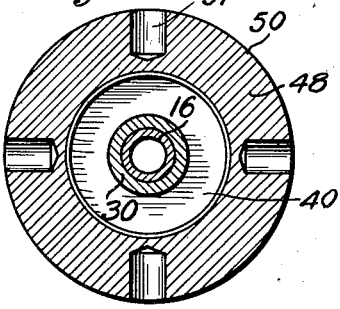
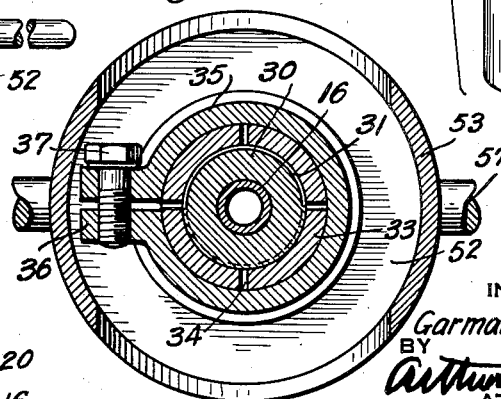
INVENTOR
Garman O. Kimmell.
BY
Arthur E. Brown
ATTORNEY

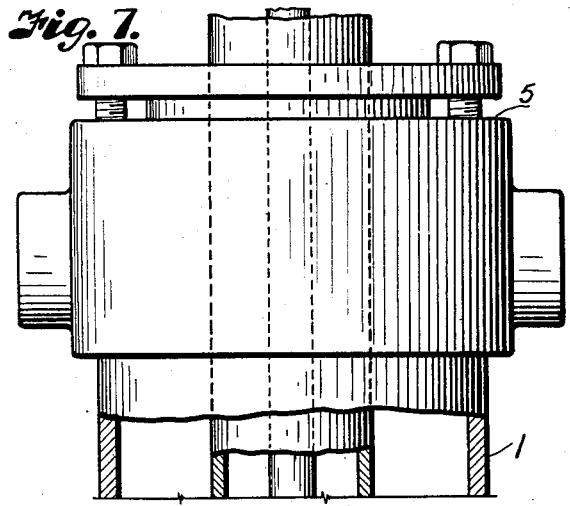
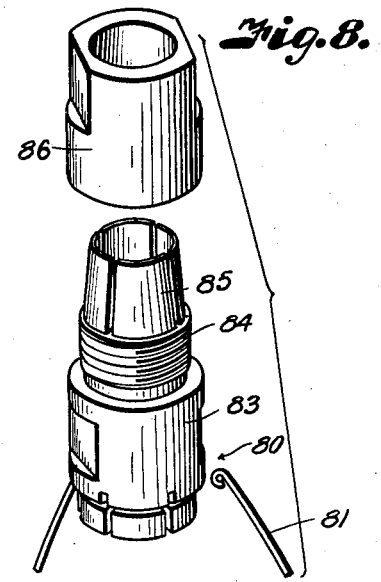
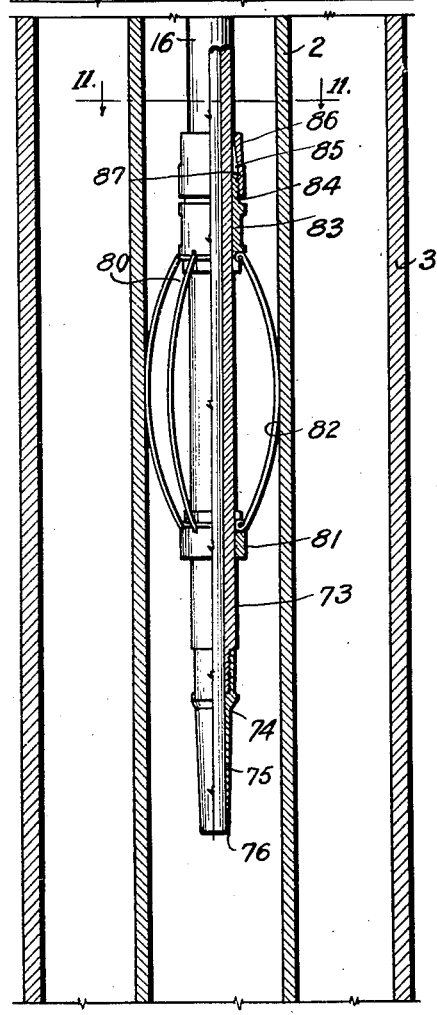
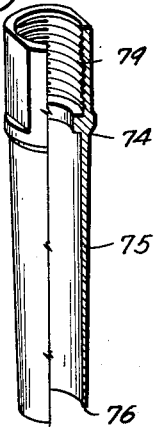
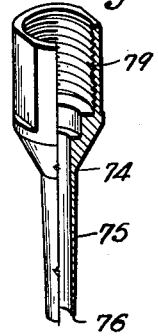
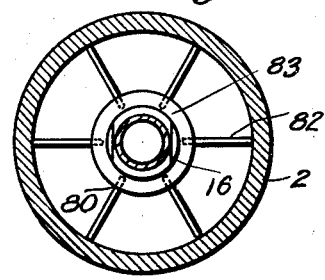
Aug. 17, 1943.   G. O. KIMMELL   2,327,111
APPARATUS FOR REMOVING SAMPLES FROM FLOWING STREAMS
Filed July 27, 1940   4 Sheets-Sheet 3
INVENTOR
Garman O. Kimmell
BY
Arthur C. Brown
ATTORNEY Aug. 17, 1943.　　　G. O. KIMMELL　　　2,327,111
APPARATUS FOR REMOVING SAMPLES FROM FLOWING STREAMS
Filed July 27, 1940　　　4 Sheets-Sheet 4

Patented Aug. 17, 1943

2,327,111

UNITED STATES PATENT OFFICE 2,327,111

APPARATUS FOR REMOVING SAMPLES FROM FLOWING STREAMS

Garman O. Kimmell, Oklahoma City, Okla.

Application July 27, 1940, Serial No. 348,063

2 Claims. (Cl. 73—21)

This invention relates to an apparatus for removing samples from flowing streams, particularly turbulently flowing composite streams such as the flow from high pressure distillate wells. Wells of this character have optimum conditions of operation under which the maximum amount of liquid hydrocarbons may be recovered if the well pressures are properly maintained. The required pressure varies with the saturation of the reservoir gas with the recoverable constituents. Consequently, it is essential to obtain accurate samples of the flow at selected pressures to determine the reservoir characteristics and the most desirable above ground conditions for the recovery of the maximum amount of liquid hydrocarbons. A vital factor in making an analysis of a well is that of obtaining a true representative sample of the well flow at well head pressures.

It is, therefore, the principal object of the present invention to provide an apparatus for obtaining representative samples of the well stream at full well head pressure during flow thereof.

In accomplishing this and other objects of the invention, as hereinafter pointed out, I have provided improved details of structure, the preferred form of which is illustrated in the accompanying drawings, wherein:

Fig. 1 is a diagrammatic view of the apparatus used in sampling a well stream discharged from a producing formation under natural formation pressures or through one of the repressuring methods well known in oil field practice.

Fig. 2 is an enlarged longitudinal section through the jack for introducing the sampling nozzle into the well tubing against the well head pressure.

Fig. 3 is an enlarged cross-section on the line 3—3 of Fig. 2.

Fig. 4 is a detail perspective view, partly in section, of one of the tube gripping slips.

Fig. 5 is a cross-section on the line 5—5 of Fig. 2.

Fig. 6 is a cross-section on the line 6—6 of Fig. 2.

Fig. 7 is an enlarged section through the upper portion of the well showing placement of the sampling nozzle and the spider for retaining the nozzle in substantially coaxial position within the well tubing.

Fig. 8 is a detail perspective view of the parts of the spider clamp shown in disassembled spaced relation to better illustrate the construction thereof.

Fig. 9 is a detail perspective view, partly in longitudinal section, of one of the sampling nozzles.

Fig. 10 is a similar view of a smaller nozzle.

Fig. 11 is a cross-section through the spider on the line 11—11 of Fig. 7.

Figure 12:
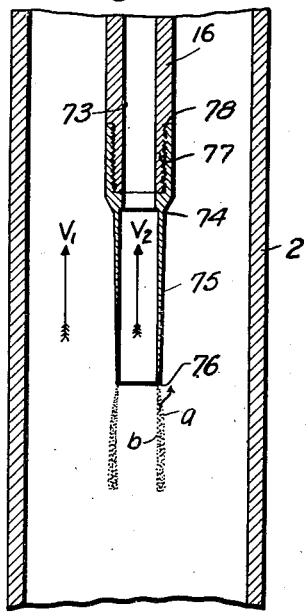
Fig. 12 is a detail sectional view through the well tubing and sampling nozzle, showing flow characteristics through the tubing when the velocity in the nozzle tip is greater than the velocity through the tubing.

Referring more in detail to the drawings:

1 designates a head of a well drilled into a gas producing formation and equipped with a well tubing 2 which extends through the casing 3 and forms a conductor through which the well flows into a separator 4. Pressure is maintained within the well by means of a casing head 5 to seal the space about the upper end of the casing 3 and tubing 2. The upper end of the tubing is provided with a cross-fitting 6 having lateral branches 7, at least one of which is connected by a pipe 8 with the liquid and gas separator 4 under control of a valve 9.

The separator 4 is of any conventional design and has a gas outlet connection 10 with a discharge line 11 equipped with a recording orifice meter 12, whereby rate of flow of the gas component of the well stream is recorded. The lower portion of the separator is equipped with the usual liquid discharge connection 13, having connection with the flow line 14 leading to a storage, indicated at 15.

The terms "distillate well" or "condensate well" are now in good engineering and legal use to describe a gas well which yields an essentially colorless product under normal conditions of operation. For this type of well the flow comprises a composite stream of hydrocarbon liquid and gas. The present conditions of supply and demand are responsible for the inability of the producer to sell the gas phase from his distillate well. Under proration rulings, if the producer cannot sell the gas, he is not allowed to waste it for the recovery of the distillate alone. The growing practice is to handle large flows from the well, extracting the distillate therefrom, and pumping the unliquefiable components back into the reservoir or producing formation. This practice eliminates waste of saleable gas and allows the extraction of the valuable distillate. Therefore it is extremely desirable to determine the pressures required in obtaining maximum recovery of the profitable liquefiable hydrocarbons, as well as other factors concerning the most desirable methods of handling the well and controlling production of the formation. In a small scale unit these factors and conditions can be determined accurately and economically. It is essential to obtain accurate representative samples of the well flow at full well head pressure for use in the small scale unit. In the small scale unit pressures can be varied from full flowing well head pressure down through the retrograde range.

I have, therefore, provided apparatus to take samples simultaneously with the flow. This is effected by introducing a sampling tube 16 into the well tubing so that a proportionate part of the flow passes through the sample tubing to a test separator 17 having capacity for determining the amount of recoverable liquid hydrocarbons at all pressures up to the pressure of the well.

In order that the tube 16 may be introduced into the well tubing under high well pressures, the tubing below the cross-fitting 6 is provided with one or more gate valves 18 to close off the well flow through the tubing so that the axial aligning branch 19 of the cross-fitting may be unplugged and equipped with a fitting 20 having a bore 21 adapted to receive the reduced threaded neck 22 of a jack-screw 23. The jack-screw 23 has a polygonal-shaped portion 24 adapted to be engaged by a wrench, to turn the neck 22 into the threaded opening 21. Extending upwardly from the portion 24 is a cylindrical shaft-like body 25, having a thread 26 formed thereon for a purpose later described. The jack-screw is further provided with an axial bore 27 continuing through the threaded neck 22 and of a size to slidably pass the sampling tube 16, as shown in Fig. 2. The upper end of the jack-screw is counterbored, as at 28, to receive a packing element 29 adapted to seal about the tubing. The packing 29 is retained in sealing position by means of a follower 30, having a threaded portion 31 engaged with an internal bore 32 formed in a reduced upward extension 33 of the jack-screw, the upward extension being provided with slots 34, Fig. 6, whereby the extension is adapted to be contracted about the threaded body 31 by means of a clamping ring 35. The clamping ring 35 is normally of a size to be freely mounted on the reduced extension and has laterally extending ears 36 through which a fastening device, such as a bolt 37, is extended to tighten the ring about the extension and prevent loosening of the packing follower 30 when desired. The follower 30 also has a polygonal-shaped flange 38, provided with radial sockets 39 to receive a spanner wrench or a turning bar (not shown), whereby the follower is moved to and from compressing relation with respect to the packing. The follower further includes an upper threaded portion 40, carrying a sleeve 41 having a plurality of jaws 42 adapted to grip the sampling tube when tapered portions 43 of the jaws are engaged in the tapered bore 44 of a clamping collar 45 that is sleeved thereover, as best shown in Fig. 2. It is thus obvious that the sampling tube may be fixed relatively to the jack-screw by causing the slip jaws to grippingly engage the sampling tube.

The collar 45 is retained between thrust bearings 46 and 47 carried within a bearing housing 48, having an internally threaded portion 49 engaging the upper threaded extension 40 of the packing follower. The bearing housing 48 has an annular portion 50 provided with radial sockets 51 to receive a suitable actuating bar, whereby the bearing housing may be rotated relatively to the packing follower to cause the collar 45 to move downwardly in contacting relation with respect to the slip jaws 42 to cause the slip jaws to grip the sampling tube when the tube is passed therethrough, as later described.

Rotatable on the threaded jack-screw is a nut 52 fixed within the lower end of a cage-like housing 53 which extends upwardly over the slips 42 and carries a chuck 54. The nut 52 has radial sockets 55 registering with openings 56 in the wall of the housing 53 to accommodate handles 57 whereby the housing may be rotated upon the jack-screw. The housing 53 is of such length to accommodate the bearing housing 48 when the nut is at the lower end of the jack-screw, so that a cap plate 58 forming the upper end of the housing amply clears the upper end of the bearing housing 48.

The upper chuck includes a body 59 having a threaded neck 60 mounted within a threaded opening 61 of the plate 58. The body 59 also includes an upper threaded periphery 62, carrying a bearing housing 63. Projecting upwardly from the threaded portion 62 is a reduced extension 64 having hooked jaws or slips 65. The jaws are tapered, as at 66, to receive the tapered bore 67 of a contracting collar 68, similar to the collar 45, previously described. The collar 68 is retained within the bearing housing 63 between thrust bearings 69 and 70. The upper bearing housing also has a portion 71 provided with radially extending handles 72, whereby the bearing housing may be rotated to move the collar 68 to and from contracting relation with respect to the jaws or slips.

The tube 16 is of sufficient length so that when introduced into the tubing the terminal end 73 thereof is located at a point within the well tubing wherein the flow is not influenced by eddy currents or other disturbing influence.

I have found that the wall thickness of the tubing at the inlet end thereof will form an obstruction and prevent taking of accurate samples of the well fluid. However, I have solved this difficulty through use of a nozzle 74, Figs. 1, 7, 9, 10 and 12 to 13 inclusive, having a thin body portion 75, the inner surface of which is a perfect cylinder and the outer surface a long slightly tapering cone to form an extremely thin entering edge 76 projecting within the well stream, the edge being of such thickness as to avoid eddy currents and resistance which interfere with taking of representative samples when other conditions are provided for, as later described.

Figure 13:
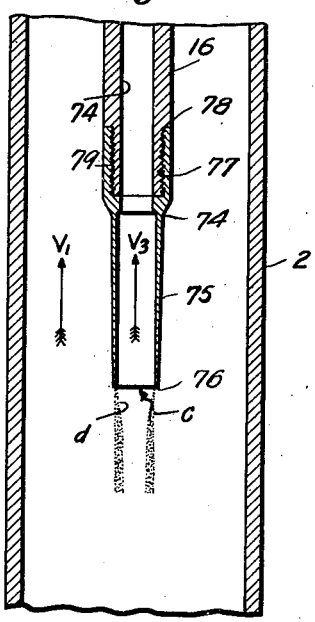
Fig. 13 is a similar view showing the flow characteristics when the velocity in the tubing is greater than the flow velocity through the nozzle.
Figure 14:
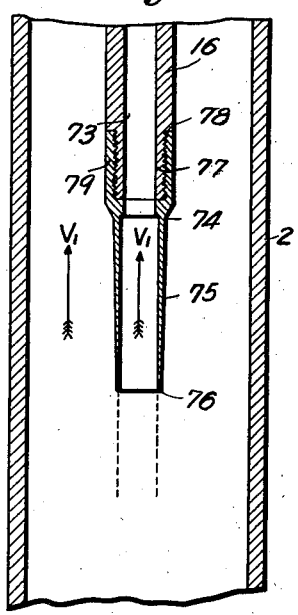
Fig. 14 is a similar view when the velocities are equal.

In order to mount the nozzle upon the end of the sampling tube, the sampling tube is preferably provided with a reduced threaded neck 77 forming a seating shoulder 78 whereon a socket 79 of the nozzle 74 is threaded as shown in Figs. 12 to 14 inclusive. The interior bore of the nozzle at the edge 76 is determined with extreme accuracy so that the effective area thereof is readily proportional with the effective cross-sectional area of the well tubing.

When the well is flowing "critically" or turbulently (not heading), a representative sample of the flow can be removed from any point within the sampling section of the tubing as long as the sampling nozzle does not touch or nearly touch the wall of the tubing. Therefore I provide the lower end of the sampling tube with a centering spider 80 that is slidable thereon to an adjusted position with respect to the inlet of the nozzle so that the spider is located a sufficient distance above the nozzle to avoid interference with taking of an accurate sample.

In the illustrated instance, the spider includes a collar 81, Fig. 7, slidable on the sampling tube and connected with bow-shaped springs 82 having their upper ends connected to a similar collar 83, the collar 83 having a threaded neck portion 84 terminating in slips 85 having tapered peripheral faces engaged within the tapered bore of a nut 86, the nut 86 being freely rotatable about the sampling tube and having a threaded portion 87 to engage the threaded portion 84 of the upper collar 83. Thus when the nut is tightened about the slip portion 85, the upper collar 83 is securely gripped in an adjusted position with respect to the sampling tube 16, to retain the inlet of the nozzle in substantial alignment with the axis of the tubing.

I have found that another essential requirement in obtaining a representative sample, is that the velocity through the thin body portion 75 of the nozzle 76 be maintained identical with velocity through the well tubing 2. This is readily explained by observing Figs. 12 to 14 inclusive. In Fig. 12, the velocity V2 in the nozzle tip is greater than the velocity V1 in the sampling section. Consequently, more material will be drawn into the nozzle tip than would normally pass the section occupied thereby. The extra material entering the nozzle would be taken from a zone between a hypothetical sampling cylinder $b$ and a hypothetical sampling cone $a$. A particle of liquid in the denser phase in the zone between the hypothetical sampling cone and the hypothetical sampling cylinder, because of its inertia, would tend to break through the hypothetical cone $a$ and by-pass the nozzle as shown by the small arrow. This would cause a loss of the denser phase in the sample and the result would be the recovery of a sample in which the ratio of the less dense to the dense phase would be too high.

In Fig. 13, the velocity V3 at the nozzle tip is less than the velocity V1 in the sampling section of the well tubing. In this instance, less material will be drawn into the nozzle tip 3 than would normally pass the section occupied by the nozzle tip. The material entering the nozzle would be taken from a zone between a hypothetical sampling cylinder $c$ and a hypothetical cone $d$. A particle of the denser phase in the zone between the hypothetical cone and cylinder, because of its inertia, would tend to break between the hypothetical sampling cone and enter the nozzle 3. As shown by the arrow indicating the path of the denser particle, this would cause a gain of the denser phase in the sample and the result would be the recovery of a sample in which the ratio of the less dense phase to the denser phase would be too low.

In Fig. 14, the velocity V1 in the nozzle tip is identical to the velocity V1 in the sampling section of the well tubing. The same amount of material will be drawn into the nozzle tip as would normally pass the nozzle section occupied by the nozzle tip, because the material entering the nozzle will be taken from a hypothetical sampling cylinder coinciding with the hypothetical sampling cone and there is no tendency for a part of the denser phase to by-pass or enter a part of the nozzle tip, and a representative sample is removed.

Apparatus is, therefore, provided for controlling velocity through the sampling tube, as now to be described. The test separator 17 is connected with the tubing 16 by means of a pipe 87. Associated with the pipe 87 is a preheater 88 and a stabilizer 89 located on the respective sides of a control valve 90. The preheater includes a coil 91 through which the sample of the well fluid is circulated, the coil being contained within a housing 92 through which steam or other heating medium is circulated. The stabilizer includes a similar coil 93 contained within a housing 94 through which a cooling medium, such as water, is circulated. The temperature of the sample may thus be regulated by controlling flow of the heating and cooling medium through the respective housings so that it is at a desired temperature when admitted into the test separator. The gas content of the sample is discharged from the separator through a pipe 95 having connection with a coil 96 of an after-heater 98, similar in construction to the preheater 92, previously described. From the coil 96 the gas is discharged through a control valve 99 into a critical flow meter 100, including a chamber 101 equipped with a pressure gauge 102 and a thermometer 103, whereby pressure and temperature within the chamber may be noted and brought to the required values. The chamber 101 has a threaded neck 104 projecting from the discharge end thereof which forms a seat for an orifice disk 105, the disk 105 being retained by a cap 106 threaded on the neck 104. The orifice 107 of the disk 105 has a size proportionate to the inlet of the nozzle, whereby the rate of flow may be maintained so that the velocity through the nozzle is equal to the velocity of the well flow passing the exterior of the nozzle. The separated liquid is taken from the test separator 17 through a pipe 109 under control of a valve 108.

In using an apparatus constructed as described, the well flow is shut off to the separator by closing the gate valves 18. The jack is then applied by screwing the threaded neck 22 thereof within the threaded bore 21 of the fitting 20, the tube 16 being contained within the jack and the nozzle end projecting within the well tubing, the chucks of the jack being loosened to permit the tube to be slid therethrough so that the nozzle is just above the uppermost valve 18. The jack-nut 52 is then moved to the upper end of the jack-screw 25. This is effected by rotating the cage-like housing 53 by means of the handles 57. The chuck 54 is then tightened about the sample tube 16 so that the slips thereof grip the tubing. The lower set of slips, however, are left in disengaged condition. Setting of the upper slips is effected by rotating the bearing housing by manipulation of the handles 72. After the discharge end of a sample tube 16 has been appropriately connected with the preheater and other test equipment, the gate valves 18 are opened so that the pressure acts directly against the nozzle of the sampling tube, but the slips of the upper chuck hold the sampling tube in position against pressure of the flowing fluid which is now being discharged through the pipe 8 into the separator. The jack-nut 52 is then rotated to the bottom of the jack-screw, causing the slips carried there-with to move the nozzle further into the well tubing. When the nut is in its lowermost position, the slips of the lower chuck are tightened about the sampling tube and the slips of the upper chuck are loosened. The sampling tube is then gripped and retained in fixed position relative to the jack-screw while the jack-nut is being moved to the upper end of the screw. When the jack-nut is at the upper end of the screw, the slips of the upper chuck are set in gripping relation with the sampling tube, after which the slips of the lower chuck are loosened so that when the nut 52 is rotated and moved in a downward direction, the nozzle is carried further into the tubing. This process is continued until the nozzle is in desired position. The well may flow in heads upon initial opening of the valve 9, and no attempt is made to take a sample until after the well is flowing steadily. When the well is flowing steadily, the pressure and flow velocity are obtained from the recording orifice meter 12 and a proper orifice plate 105 is selected and applied to the critical flow meter so that the flow through the sampling tube to the test separator approximately equals the velocity flow exteriorly of the nozzle.

Figure 15:
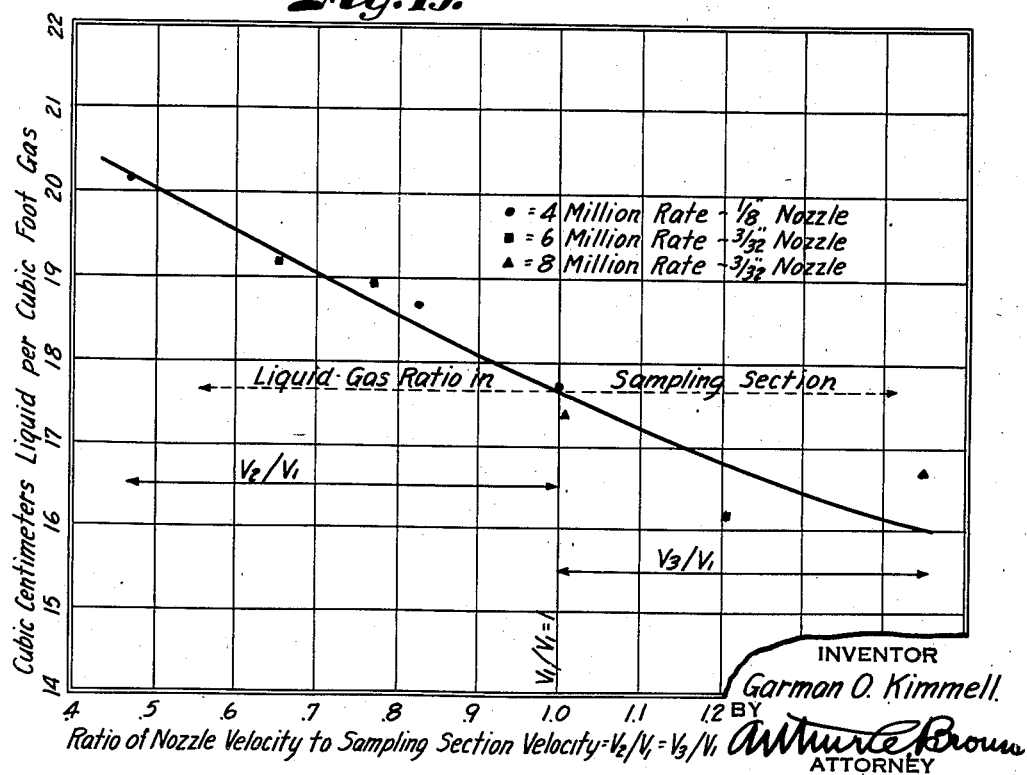
Fig. 15 is a graph depicting data obtained during tests of the flow in an actual well.

The sample data obtained during actual tests of a well are represented in the graph in Fig. 15. A 3/32 inch nozzle was examined for its ability to remove a representative sample at two rates of flow from the well; six and eight million standard cubic feet of separated gas per day. A 1/8 inch nozzle was examined at a rate of flow of four million cubic feet of separated gas per day. The cubic centimeters of liquid per cubic foot of gas are indicated by the line of the graph. Under all three conditions, a ratio of liquid to gas of approximately 17.7 cubic centimeters per cubic foot was obtained in the experimental unit when the ratio of velocities inside and outside the sampling nozzles were equal, but any sampling condition resulting in a deviation of unity ratio of velocities inside and outside the nozzle tip gave an erroneous indication of the liquid gas ratio, as shown by the chart.

With a truly representative fractional part of the well stream available, it is possible to examine the characteristics of a total well stream on a small scale unit. Because of increased accuracy and convenience of operation of a small scale testing unit, it is possible to take data with a greatly increased rate of speed and at the same time materially improve on accuracy obtained in full scale tests, all this being possible through my improved apparatus for taking truly representative samples, as above described.

What I claim and desired to secure by Letters Patent is:

1. In combination with a high pressure oil or gas well tubing flowing a fluid under pressure, means for taking a sample of the fluid under flow including a sampling tube extending into the tubing, a thin walled sampling nozzle carried by the sampling tube and having a cylindrical inner bore to pass a sample flow therethrough and having a long tapering outer surface cooperating with the surface of the bore to form an extremely thin entering edge for said nozzle, centering means supporting the tube with the axis of said cylindrical bore and said extremely thin entering edge of the sampling nozzle in substantially coaxial relation with the tubing whereby a predetermined proportion of the fluid is caused to enter the nozzle, and means connected with the sampling tube for maintaining velocity flow through the bore of the sampling nozzle proportional to the velocity flow through the tubing.

2. In combination with a high pressure oil or gas well tubing flowing a fluid under pressure, means for taking a sample of the fluid under flow including a sampling tube extending into the flow line, a thin walled sampling nozzle carried by the sampling tube and having a cylindrical inner bore to pass a sample flow therethrough and having a long tapering outer surface cooperating with the surface of the bore to form an extremely thin entering edge for said nozzle, centering means supporting the tube with the axis of said cylindrical bore and said extremely thin entering edge of the sampling nozzle in substantially coaxial relation with the flow line whereby a predetermined proportion of the fluid is caused to enter the nozzle, and means connected with the sampling tube for regulating the temperature and controlling the volume of the fluid flowing from the sampling tube for maintaining velocity flow through the bore of the sampling nozzle proportional to the velocity flow through the tubing.

GARMAN O. KIMMELL.